US006444934B1

(12) United States Patent
Imura et al.

(10) Patent No.: US 6,444,934 B1
(45) Date of Patent: Sep. 3, 2002

(54) DRIVING FORCE STORING DEVICE FOR A SWITCH OPERATING MECHANISM

(75) Inventors: Mitsuyoshi Imura, Tokyo (JP); Nobuya Nakajima, Tokyo (JP); Kyouichi Ohtuka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/919,802

(22) Filed: Aug. 2, 2001

(30) Foreign Application Priority Data

Jan. 31, 2001 (JP) ....................................... 2001-024010

(51) Int. Cl.$^{7}$ .......................... F16H 55/00; H01H 33/02

(52) U.S. Cl. ...................................... 200/400; 200/17 R

(58) Field of Search ................................. 200/17 R, 18, 200/400, 401, 500, 501; 218/84, 154

(56) References Cited

U.S. PATENT DOCUMENTS 4,163,133 A * 7/1979 Bould ........................ 200/400
4,256,941 A * 3/1981 Bachler ....................... 200/400
4,839,476 A 6/1989 Okuno ......................... 200/17
5,901,838 A * 5/1999 Nakatani et al. ............ 200/400
6,232,569 B1 5/2001 Nakajima et al. ........... 200/400
6,316,739 B1 * 11/2001 Ohtsuka et al. ............. 200/400

* cited by examiner

*Primary Examiner*—Michael Friedhofer
(74) *Attorney, Agent, or Firm*—Sughrue Mion, PLLC

(57) ABSTRACT

In a driving force storing device for a switch operating mechanism, a joint device has a first joint portion including a first opposing surface, a second joint portion including a second opposing surface, and a coupling portion. A first torsion bar is connected between the first joint portion and a driving shaft portion. A second torsion bar is connected between the second joint portion and a fixed member. A torque is applied to the joint device by the first and second torsion bars in a direction where the first and second opposing surfaces are separated from each other and the first and second joint portions are pushed toward the coupling portion.

8 Claims, 11 Drawing Sheets

DRIVING FORCE STORING DEVICE FOR A SWITCH OPERATING MECHANISM

CROSS REFERENCE TO RELATED APPLICATION

This application is based on Application No. 2001-24010, filed in Japan on Jan. 31, 2001, the contents of which are hereby incorporated by reference.

BACKGROUND OF THE INVENTION

1. Field of the Invention

The present invention relates to a driving force storing device for a switch operating mechanism, which is employed in the switch operating mechanism for opening and closing, for example, a power switch installed at a substation or a switching station, and stores a driving force from torsion bar elasticity for opening/closing operations.

2. Description of the Related Art

FIG. 11 is a perspective view showing a conventional driving force storing device for a switch operating mechanism, and FIG. 12 is a perspective view showing the joint device in FIG. 11.

In the figures, a driving force storing device which stores a rotational driving force for driving a switch is provided with a first torsion bar 1, a second torsion bar 2, and a joint device 40 joining the first torsion bar 1 and the second torsion bar 2.

The joint device 40 has a first joint portion 3 to which one end of the first torsion bar 1 is fixed, and a second joint portion 4 to which one end of the second torsion bar 2 is fixed.

The other end of the second torsion bar 2 is fixed to a fixed member 9 fixed to a fixed part (not shown), that is, for example, a housing or the like, of this switch operating mechanism. The first joint portion 3 and the second joint portion 4 are rotatably coupled to one another by a pin 5. The pin 5 is inserted into a hole 40a penetrating a concave-convex portion 3*a* of the first joint portion 3 and a concave-convex portion 4*a* of the second joint portion 4. A spacer body 6 is inserted between the first joint portion 3 and the second joint portion 4.

Further, the first and second joint portions 3 and 4 are tightened by a bolt 7 and a nut 8. Initial torque of the driving force storing device is adjusted by changing the distance between the first torsion bar 1 and the second torsion bar 2 by changing the thickness of the spacer body 6. Furthermore, the thickness of the spacer body 6 is adjusted by changing the number or the thickness of spacers constituting the spacer body 6.

The other end of the first torsion bar 1 is fixed to a driving shaft portion 10. The driving shaft portion 10 is supported by bearings 11 and 12 fixed to the housing of the switch operating mechanism. A first lever 13 is fixed to the driving shaft portion 10, and the first lever 13 is mechanically connected to a second lever 17 through a link bar 14 to interlock with the second lever 17.

The second lever 17 is fixed to a rotation shaft 18 of a larger gear 22. The rotation shaft 18 is supported by bearings 19 and 20 fixed to the housing of the switch operating mechanism. A one way clutch (backstop clutch) 21 is provided between the rotation shaft 18 and the larger gear 22. When the larger gear 22 is rotated in the direction of arrow I, the rotation shaft 18 is rotated in the same direction. However, when the larger gear 22 is rotated in the reverse direction of arrow I, the rotation is not transmitted to the larger gear 22.

The larger gear 22 is meshed with a smaller gear 23. The smaller gear 23 is rotated by a motor 24.

Next, the operation will be described. When the motor 24 is driven and the smaller gear 23 is rotated in the direction of arrow G at the given number of revolutions, the larger gear 22 is rotated only to a given angle in the direction of arrow I. The rotational motion in the direction of arrow I of the larger gear 22 is transmitted to the second lever 17 through the one way clutch 21 and the rotation shaft 18, thereby moving the link bar 14 in the direction of arrow H.

When the link bar 14 is moved in the direction of arrow H, the first lever 13 is pivoted in the direction of arrow K and first torsion bar 1 is twisted in the given angle about its center axis. When the first torsion bar 1 as a rod-like elastic body is twisted and the second torsion bar 2 as a rod-like elastic body connected to the first torsion bar 1 through the joint device 40 is twisted, resilient forces are stored in the first and second torsion bars 1 and 2.

Thus, when the first lever 13 is pivoted to the given angle and the driving force storing device becomes a fully stored state where the driving force storing device keeps the given resilient forces, the driving power supply of the motor 24 is cut by a limit switch (not shown) and the motor 24 is stopped. At this time, the first lever 13 is held at the position of the aforementioned fully stored state by a latch mechanism (not shown) provided in the switch operating mechanism. Accordingly, the resilient forces of the first and second torsion bars 1 and 2 are maintained stored as they are.

The resilient forces stored in the driving force storing device are released instantly by unlatching the above latch mechanism. After releasing the resilient forces, the first and second torsion bars 1 and 2 return to a state where only the initial torque is stored. When the resilient forces of the driving force storing device are released, the driving shaft portion 10 connected to the first torsion bar 1 is rotated, and an opening/closing operating portion of the switch, which is connected to the driving shaft portion 10 is driven to be opened or closed.

In such a conventional driving force storing device for the switch operating mechanism as described above, since the direction of the torque applied to the joint device 40 by the first and second torsion bars 1 and 2 is the direction for clamping the spacer body 6, an excessive bending force is applied to the pin 5 located on the opposite side. For reducing the bending load applied to the pin 5, the first and second joint portions 3 and 4 are provided with the concave-convex portions 3*a* and 4*a,* respectively. Accordingly, complicated machining is required at the time of fabricating the first and second joint portions 3 and 4, increasing the production cost, so the whole apparatus becomes costly.

SUMMARY OF THE INVENTION

In order to solve the above-noted defects, an object of the present invention is to provide a driving force storing device for a switch operating mechanism which can reduce production costs by simplifying the construction of parts, to reduce the price of the whole apparatus.

To this end, according to one aspect of the present invention, there is provided a driving force storing device for a switch operating mechanism, comprising: a joint device having a first joint portion on which a first opposing surface is formed, a second joint portion on which a second opposing surface opposing the first opposing surface is formed, and a coupling portion coupling the first joint portion with the second joint portion so that a distance between the first and second opposing surfaces is changeable; a driving shaft portion mechanically connected to an operating portion of the switch operating mechanism, the driving shaft portion being rotatable between a stored position and a released position; a first torsion bar connected between the first joint portion and the driving shaft portion, for storing a driving force by increasing the degree of twisting by rotating the driving shaft portion from the released position to the stored position, and for rotating the driving shaft portion from the stored position to the released position at the time of releasing; a fixed member fixed to a fixed part of the switch operating mechanism; a second torsion bar connected between the second joint portion and the fixed member; and an initial torque adjusting mechanism for adjusting an initial torque applied to the driving shaft portion positioned at the released position by adjusting a distance between the first and second opposing surfaces; wherein a torque is applied to the joint device by the first and second torsion bars in a direction where the first and second opposing surfaces are separated from each other and the first and second joint portions are pushed toward the coupling portion.

According to another aspect of the present invention, there is provided a driving force storing device for a switch operating mechanism, comprising: a joint member; a driving shaft portion mechanically connected to an operating portion of the switch operating mechanism, the driving shaft portion being rotatable between a stored position and a released position; a first torsion bar connected between the joint member and the driving shaft portion, for storing a driving force by increasing the degree of twisting by rotating the driving shaft portion from the released position to the stored position, and for rotating the driving shaft portion from the stored position to the released position at the time of releasing; a fixed member fixed to a fixed part of the switch operating mechanism; and a second torsion bar connected between the joint member and the fixed member; wherein a fixing angle of the fixed member against the fixed part of the switch operating mechanism is adjustable about the second torsion bar, and an initial torque applied to the driving shaft portion positioned at the released position is adjusted by adjusting the fixing angle of the fixed member.

DETAILED DESCRIPTION OF THE PREFERRED EMBODIMENTS

A preferred embodiment of the present invention will now be described with reference to the accompanying drawings.

First Embodiment

Figure 1:
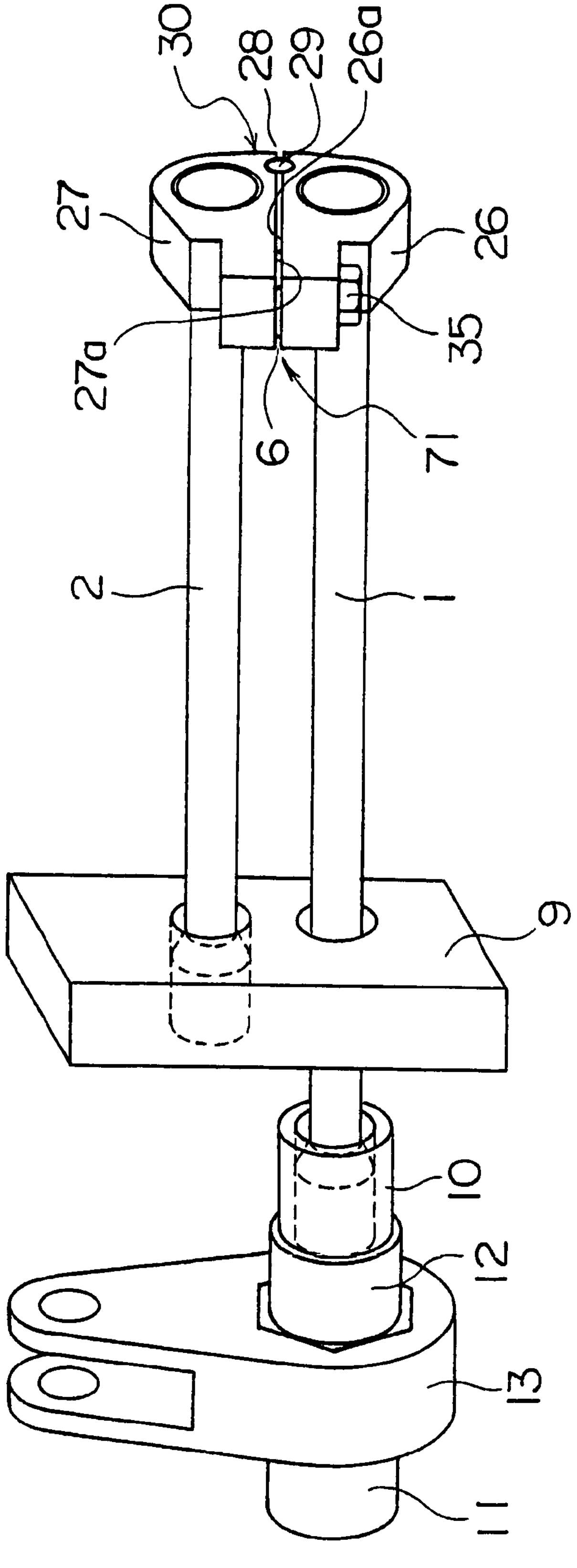
FIG. 1 is a perspective view showing a driving force storing device for a switch operating mechanism according to a first embodiment of the present invention.
Figure 2:
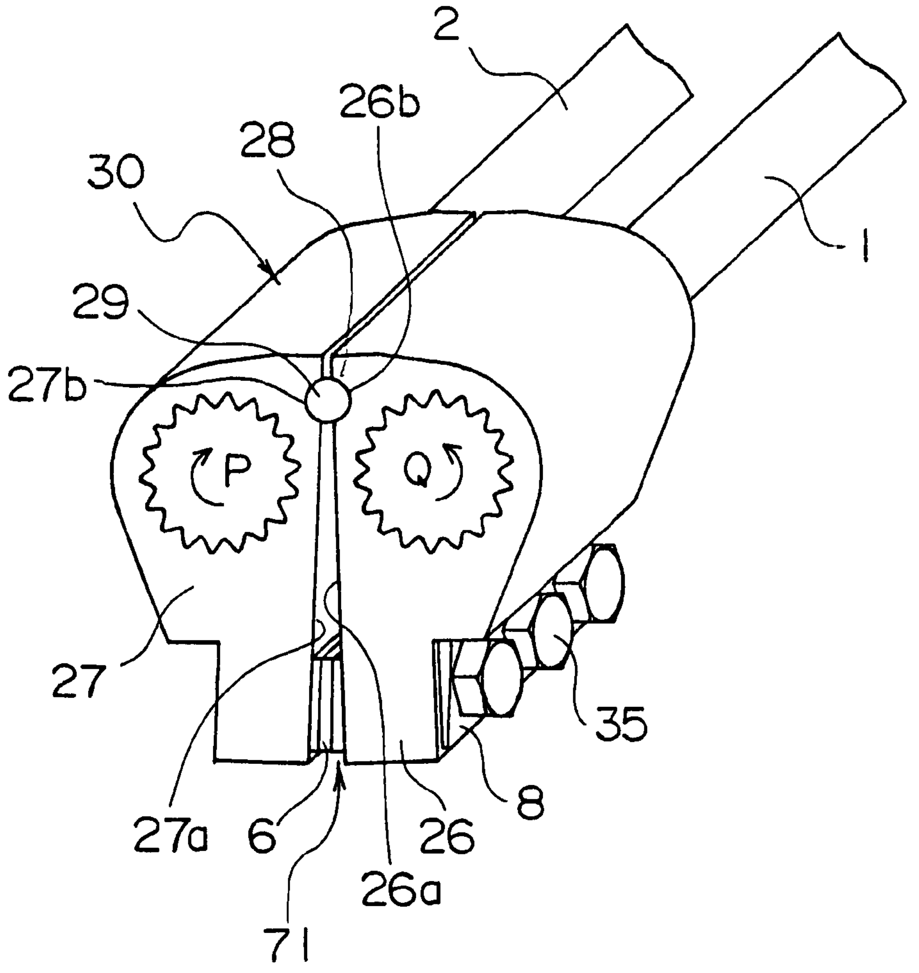
FIG. 2 is a perspective view showing the joint device in FIG. 1.

FIG. 1 is a perspective view showing a driving force storing device for a switch operating mechanism according to a first embodiment of the present invention, and FIG. 2 is a perspective view showing the joint device in FIG. 1.

In the figures, a joint device 30 has a first joint portion 26 on which a first opposing surface 26*a* is formed, a second joint portion 27 on which a second opposing surface 27*a* opposing the first opposing surface 26*a* is formed, and a coupling portion 28 coupling the first and second joint portions 26 and 27 so the distance between the first and second opposing surfaces 26*a* and 27*a* can be adjusted.

The first and second joint portions 26 and 27 are constituted by separate parts, respectively. The coupling portion 28 has a pin 29 disposed between the first and second joint portions 26 and 27, and pin grooves 26*b* and 27*b* formed on the joint portions 26 and 27, respectively, in which the pin 29 is inserted. The distance between the first and second opposing surfaces 26*a* and 27*a* is adjustable by pivoting the first and second joint portions 26 and 27 about the pin 29.

The driving shaft portion 10 is capable of rotating between a stored position and a released position. A first lever 13 which is a part of an operating portion of the switch operating mechanism is fixed to the driving shaft portion 10. Further, the driving shaft portion 10 is supported by bearings 11 and 12 fixed to a housing (not shown) of the switch operating mechanism.

One end of a first torsion bar 1 as a rod-like elastic body is fixed to the first joint portion 26. The other end of the first torsion bar 1 is fixed to the driving shaft portion 10. The first torsion bar 1 and the driving shaft portion 10 are disposed coaxially. When the driving shaft portion 10 is rotated from the released position to the stored position, the degree of twisting of the first torsion bar 1 is increased to store the driving force, and the driving shaft portion 10 is rotated from the stored position to the released position at the time of releasing.

A fixed member (fixed plate) 9 is fixed to a fixed part (not shown), that is, for example, a housing or the like, of this switch operating mechanism. The first torsion bar 1 penetrates the fixed member 9. One end of a second torsion bar 2 as a rod-like elastic body is fixed to the second joint portion 27. The other end of the second torsion bar 2 is fixed to the fixed member 9. The first and second torsion bars 1 and 2 are juxtaposed with each other. A spacer body 6, the thickness of which is adjustable, is disposed between the first and second opposing surfaces 26*a* and 27*a*. The thickness of the spacer body 6 is adjusted by changing the number or the thickness of spacers constituting the spacer body 6. The first and second joint portions 26 and 27 are provided with a plurality set of fasteners 35 which restrain the opening of the first and second opposing surfaces 26*a* and 27*a* to hold the spacer body 6 between the first and second opposing surfaces 26*a* and 27*a*. Each fastener 35 is constituted by, for example, a bolt and a nut.

Tapered washers 8 corresponding to the inclination of the seat surface of the fastening portion of the fasteners 35 against the first joint portion 26 are inserted between the first joint portion 26 and the fastening portion of the fasteners 35 so as not to generate bending stress in the fasteners 35.

An initial torque adjusting mechanism 71 has the spacer body 6, the fasteners 35 and the tapered washers 8. An initial torque applied to the driving shaft portion 10 positioned at the released position is adjusted and maintained by adjusting the distance between the first and second opposing surfaces 26*a* and 27*a* by changing the thickness of the spacer body 6.

Further, torque applied in the direction where the first and second opposing surfaces 26*a* and 27*a* are opened and the first and second joint portions 26 and 27 are pushed to the coupling portion 28, i.e., pin 29, are constantly applied to the joint device 30 by the first and second torsion bars 1 and 2 as shown by the arrows P and Q in FIG. 2. In other words, a compressive load is applied to the pin 29, and a tensile load is applied to the fasteners 35.

Next, the adjusting method for the initial torque will be described. First, in a completely released state, i.e., an initial torque state where the driving shaft portion 10 is rotated to the released position and the given rotational driving force is released, the fasteners 35 are loosened, and the distance between the first and second opposing surfaces 26*a* and 27*a* is increased by the initial torque. From this state, the thickness of the spacer body 6 is increased to increase the initial torque, or the thickness of the spacer body 6 is decreased to decrease the initial torque.

When the thickness of the spacer body 6 is changed, the first joint portion 26 and the seat surface of the fastening portion of the fasteners 35 become out of parallel with each other. Accordingly, if the fasteners 35 are fastened just as they are, a bending stress is generated in the fasteners 35, thereby decreasing strength of the fasteners 35. To prevent this, tapered washers 8 corresponding to the inclination of the seat surface are inserted and fastened. Thus, desired initial torque can be obtained.

In such a driving force storing device, since the direction of the torque applied to the joint device 30 by the first and second torsion bars 1 and 2 is the direction where the first and second opposing surfaces 26*a* and 27*a* are opened and the first and second joint portions 26 and 27 are pushed to the coupling portion 28, the coupling portion 28 is merely required to bear a compressive load, and the construction of the coupling portion 28 can be simplified, thereby reducing production costs and the whole price.

Since the coupling portion 28 has the simple construction where the pin 29 as a fulcrum is clamped between the first and second joint portions 26 and 27, the construction of the parts can be further simplified, thereby reducing the whole price.

Further, the initial torque adjusting mechanism 71 having the spacer body 6 and the fasteners 35 is used, the initial torque can be adjusted easily by the simple construction.

Figure 3:
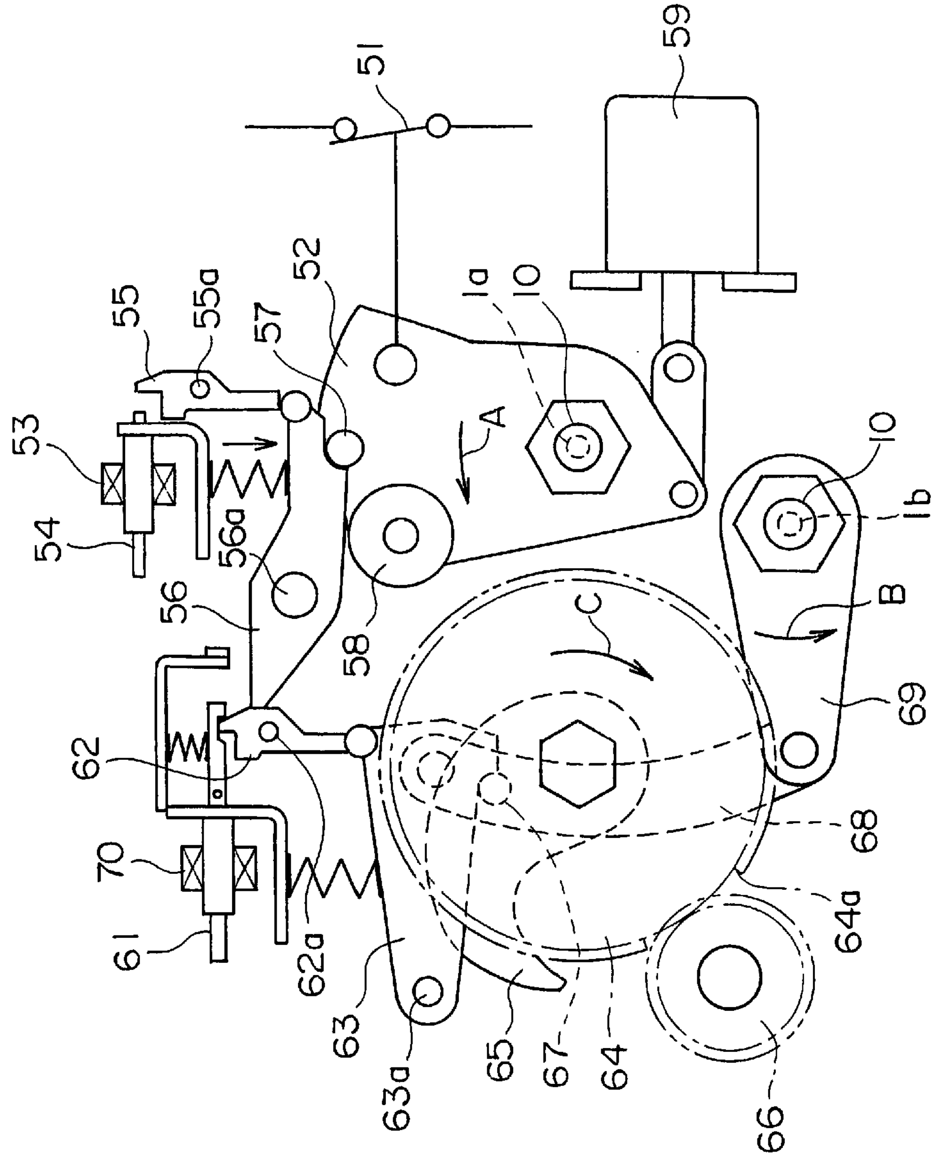
FIG. 3 is a structural view showing an example of the switch operating mechanism.

Next, opening/closing operations of the switch operating mechanism by the above-described driving force storing device will be described. FIG. 3 is a structural view showing an example of the switch operating mechanism, and more particularly showing a closed circuit state of a switch 51. In FIG. 3, a movable contact of the switch 51 for opening and closing a circuit is mechanically connected to a driving lever 52. The driving lever 52 corresponds to the lever 13 of the driving force storing device in FIG. 1.

A breaking spring 1*a* is joined to the driving lever 52 through the driving shaft portion 10. The breaking spring 1*a* corresponds to the first torsion bar 1 of the driving force storing device in FIG. 1. A breaking spring 1*a* as a rod-like elastic body is disposed to extend in a direction perpendicular to the plane of FIG. 3.

The driving lever 52 is urged to pivot in the direction of arrow A about the driving shaft portion 10 by the rotational driving force stored in the breaking spring 1*a*. However, as shown in FIG. 3, since a tripping latch 56 is engaged with a first pin 57 provided at the driving lever 52, the driving lever 52 is maintained at a position shown in FIG. 3. Pivoting of the tripping latch 56 is locked by a tripping trigger 55 interlocking with a tripping electromagnet 53.

Further, an oil buffer 59 is joined with the driving lever 52, and buffers impact of the movable contacts of the switch 51 at the time of the opening/closing operation.

Furthermore, as shown in FIG. 3, when the switch 51 is in the closed circuit state, pivoting of a making trigger 62 is locked by contacting the tripping latch 56. The making trigger 62 is pivoted by a making plunger 61 of a making electromagnet 70. Rotational motions of a larger gear 64 are locked by engaging the making trigger 62 with a making latch 63.

The making latch 63 is engaged with a second pin 67 provided on the larger gear 64. The larger gear 64 is mechanically connected with a link bar 68 and a making lever 69. A making spring 1*b* is joined with the making lever 69 through the driving shaft portion 10. The making spring 1*b* corresponds to the first torsion bar 1 of the driving force storing device in FIG. 1.

In this switch operating mechanism, two sets of the driving force storing devices as shown in FIG. 1 are used for breaking and throwing, respectively. The making spring 1*b* as a rod-like elastic body is disposed to extend in a direction perpendicular to the plane of FIG. 3.

The making lever 69 is urged to pivot in the direction of arrow B about the driving shaft portion 10 by the rotational driving force stored in the making spring 1*b*. Accordingly, in the closed circuit state shown in FIG. 3, the larger gear 64 is urged to rotate in the direction of arrow C.

A cam 65 rotated with the larger gear 64 is provided on the larger gear 64. Further, a toothed portion of the larger gear 64 is provided with a toothless portion 64*a*. In the closed circuit state of the switch 51 shown in FIG. 3, the toothless portion 64*a* opposes the teeth of a smaller gear 66. Accordingly, in the closed circuit state of the switch 51 shown in FIG. 3, the rotational motion of the smaller gear 66 is not transmitted to the larger gear 64.

Figure 4:
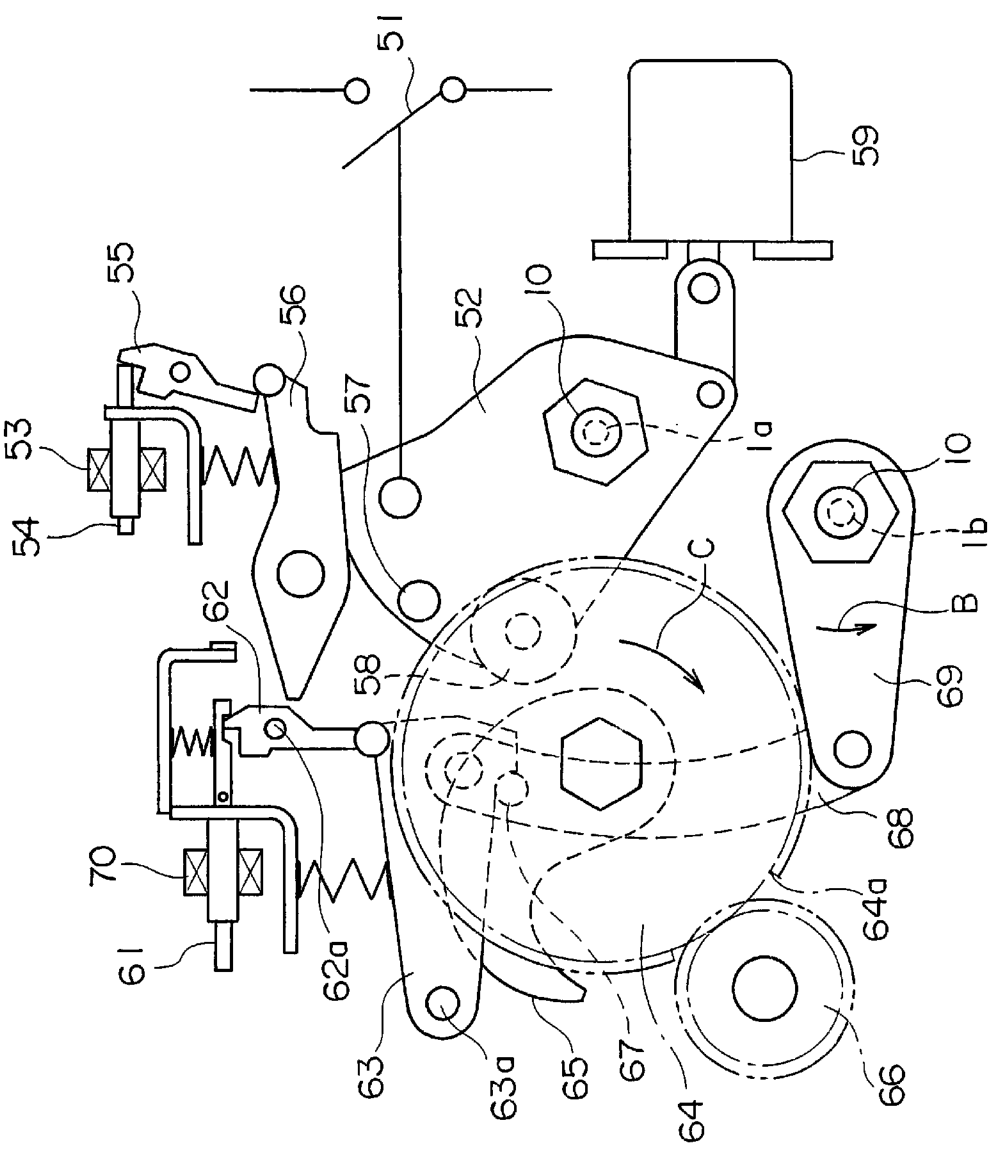
FIG. 4 is a structural view showing an opened state of the switch operating mechanism in FIG. 3.
Figure 5:
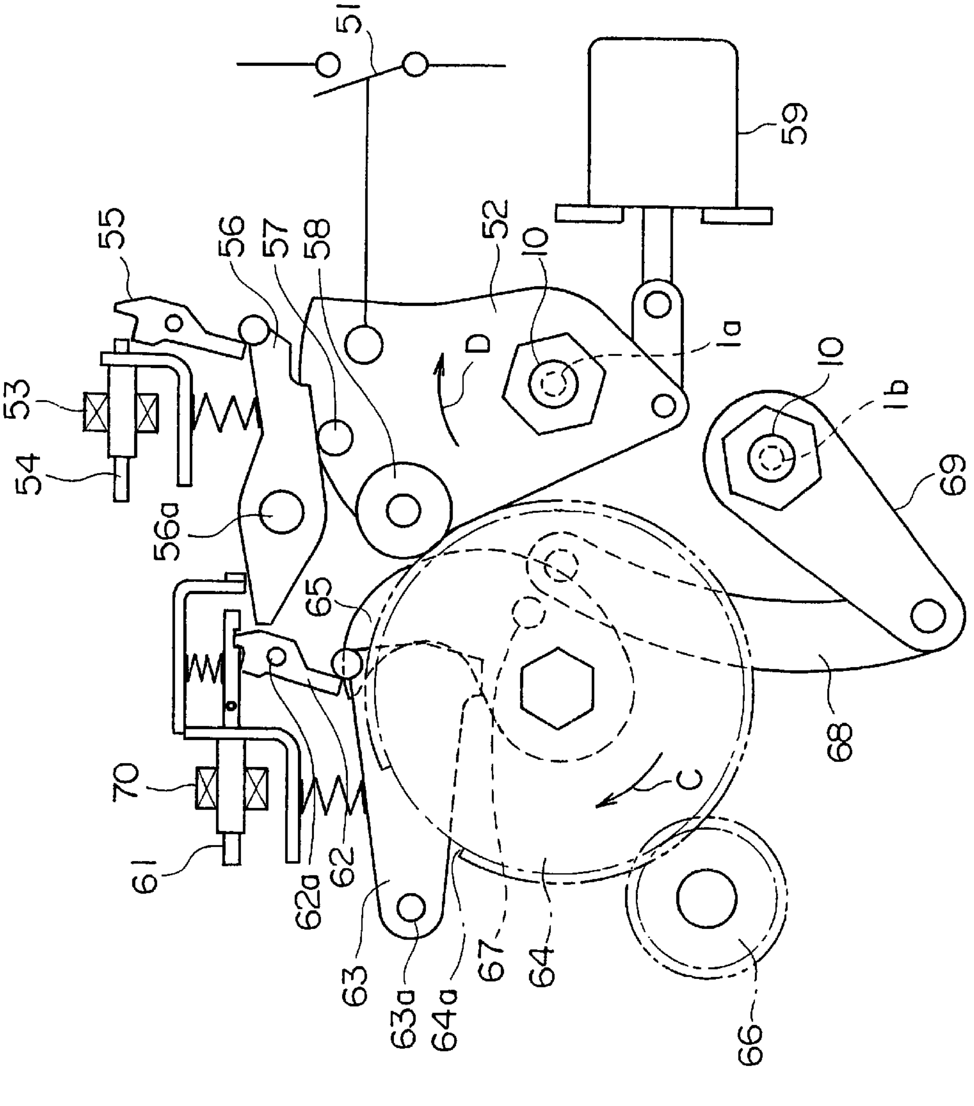
FIG. 5 is a structural view showing a state during closing operation of the switch operating mechanism in FIG. 3.
Figure 6:
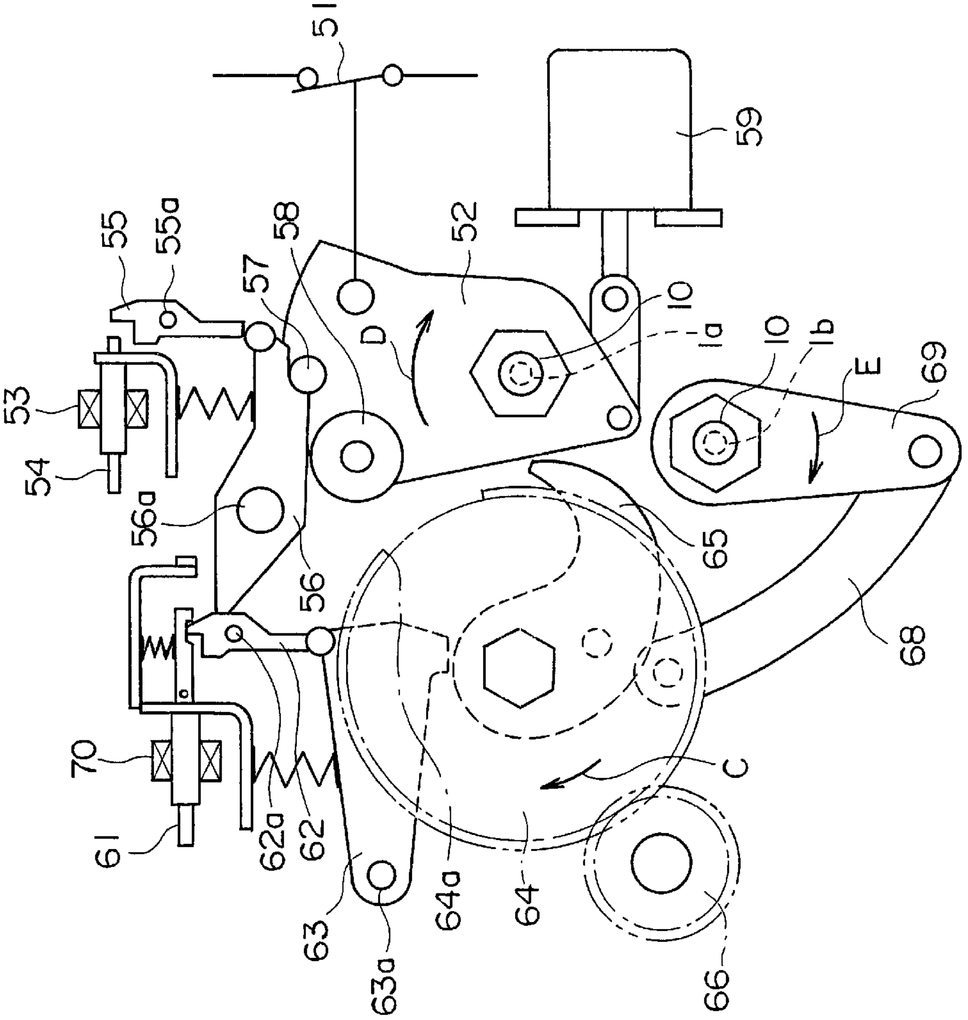
FIG. 6 is a structural view showing an initial closing state of the switch operating mechanism in FIG. 3.

Next, opening/closing driving operations will be described. FIG. 4 is a structural view showing an opened state of the switch operating mechanism in FIG. 3, FIG. 5 is a structural view showing a state during closing operations of the switch operating mechanism in FIG. 3, and FIG. 6 is a structural view showing an initial closing state of the switch operating mechanism in FIG. 3.

In the closed circuit state of the switch 51 shown in FIG. 3, when the tripping electromagnet 53 is energized and a tripping plunger 54 is moved to the right in the figure, the tripping trigger 55 is pivoted about an axis 55*a* in the clockwise direction in the figure. By pivoting of the tripping trigger 55, the tripping latch 56 is pivoted about an axis 56*a* in the counterclockwise direction in the figure, and the engagement between the first pin 57 fixed to the driving lever 52 and the tripping latch 56 is released. As a result, the driving lever 52 urged by the breaking spring 1*a* is pivoted in the direction of arrow A in the figure, and the movable contact of the switch 51 is driven in the opening direction.

FIG. 4 is the structural view showing the switch operating mechanism in FIG. 3 in the opened state of the switch 51. As shown in FIG. 4, in the opened state of the switch 51, the tripping latch 56 does not contact the making trigger 62, the making trigger 62 is capable of pivoting in the clockwise direction in the figure. Also, in the opened state shown in FIG. 4, the rotational driving force stored by the breaking spring 1*a* has been released, and only the initial torque is applied to the driving lever 52.

When the making electromagnet 70 is excited and the making plunger 61 is moved to the right in the figure from the state in Fig.4, the making trigger 62 is pivoted about an axis 62*a* in the clockwise direction in the figure. Accordingly, the making latch 63 is pivoted about an axis 63*a* in the counterclockwise direction in the figure, to thereby release the engagement between the making latch 63 and the second pin 67. Then, the larger gear 64 is rotated in the direction of arrow C in FIG. 4.

FIG. 5 is the structural view showing the state during closing operation of the switch operating mechanism in FIG. 3, more particularly showing the state where the larger gear 64 is rotated in the direction of arrow C from the state in FIG. 4. By the rotation of the larger gear 64 in the direction of arrow C, the cam 65 contacts a roller follower 58 rotatably provided at the driving lever 52, and the driving lever 52 is pushed to pivot in the direction of arrow D. Accordingly, the movable contact of the switch 51 mechanically connected to the driving lever 52 is closed, and the switch 51 becomes the closed circuit state.

FIG. 6 is a structural view showing an initial closing state of the switch operating mechanism in FIG. 3, more particularly showing the state right after the driving lever 52 is pivoted in the direction of arrow D and the movable contact is closed.

When the state of the switch is changed from the opened circuit state shown in FIG. 4 to the initial closing state shown in FIG. 6, since the driving lever 52 is pivoted in the direction of arrow D, the resilient force as the rotational driving force is stored in the breaking spring 1*a* connected to the driving lever 52 by the torsional force of the driving lever 52. Accordingly, in the closed circuit state shown in FIG. 6, the breaking spring 1*a* is in the state where the rotational driving force is stored.

At this time, the rotational driving force of the making spring 1*b* connected to the larger gear 64 is released with the set initial torque remaining. Further, in the first embodiment, the rotational driving force released by the making spring 1*b* is set to be greater than the rotational driving force of the breaking spring 1*a* so that the rotational driving force is stored in the breaking spring 1*a* by the releasing operation of the making spring 1*b*.

In the initial closing state of the switch 51 shown in FIG. 6, when the smaller gear 66 is rotated by the driving force of a device, for example, a motor (not shown), provided outside of the switch operating mechanism, the larger gear 64 is rotated in the direction of arrow C, and the making lever 69 is pivoted in the direction of arrow E. When making lever 69 is pivoted in the direction of arrow E, the resilient force as the rotational driving force is stored in the making spring 1*b*, the switch 51 becomes the complete closed circuit state shown in FIG. 3.

Since the line of action of the link bar 68 across the rotational center of the larger gear 64 during shifting from the initial closing state shown in FIG. 6 to the complete closed state shown in FIG. 3, the larger gear 64 is in the state where it is rotated in the direction of arrow C by pivoting the making lever 69 shown in FIG. 3 in the direction of arrow B.

Further, as shown in FIG. 3, in the complete closed circuit state of the switch 51, the toothless portion 64*a* of the larger gear 64 is adapted to oppose the smaller gear 66 when the making spring 1*b* stores the force and the second pin 67 is engaged with the making latch 63. Therefore, in the complete closed circuit state shown in FIG. 3, even if the smaller gear 66 is rotated by the motor or the like, the larger gear 64 is not rotated to maintain the complete closed circuit state shown in FIG. 3.

Second Embodiment

Figure 7:
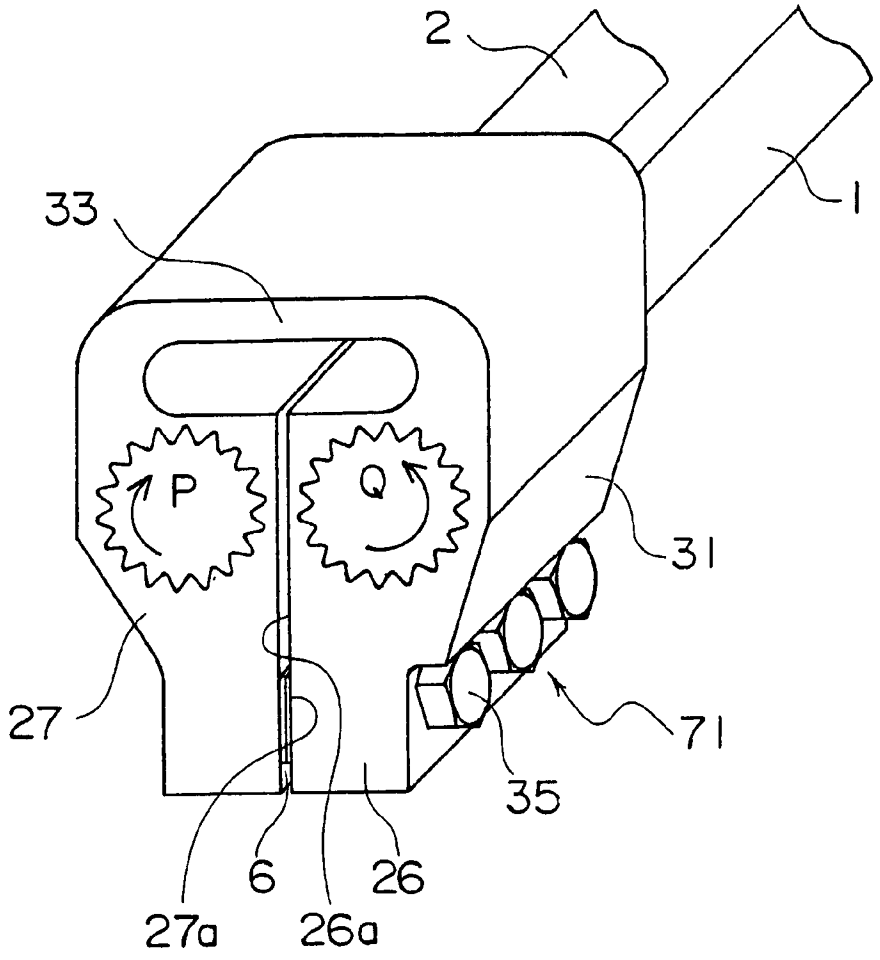
FIG. 7 is a perspective view showing a joint device of a driving force storing device for a switch operating mechanism according to a second embodiment of the present invention.

Next, FIG. 7 is a perspective view showing a joint device of a driving force storing device for a switch operating mechanism according to a second embodiment of the present invention. In the figure, a joint device 31 has a first joint portion 26, a second joint portion 27, and an elastic deformation portion 33 as a coupling portion coupling the first joint portion 26 with the second joint portion 27. The distance between the first and second opposing surfaces 26*a* and 27*a* is capable of being changed by elastically deforming the elastic deformation portion 33. The other constructions are the same as in the first embodiment.

The construction of the coupling portion can be simplified by the driving force storing device having such a joint device 31, thereby reducing the production cost and the whole price. Also, since the first and second joint portions 26 and 27 are incorporated with each other by the elastic deformation portion 33, the number of parts can be reduced and assembly can be facilitated.

Third Embodiment

Figure 8:
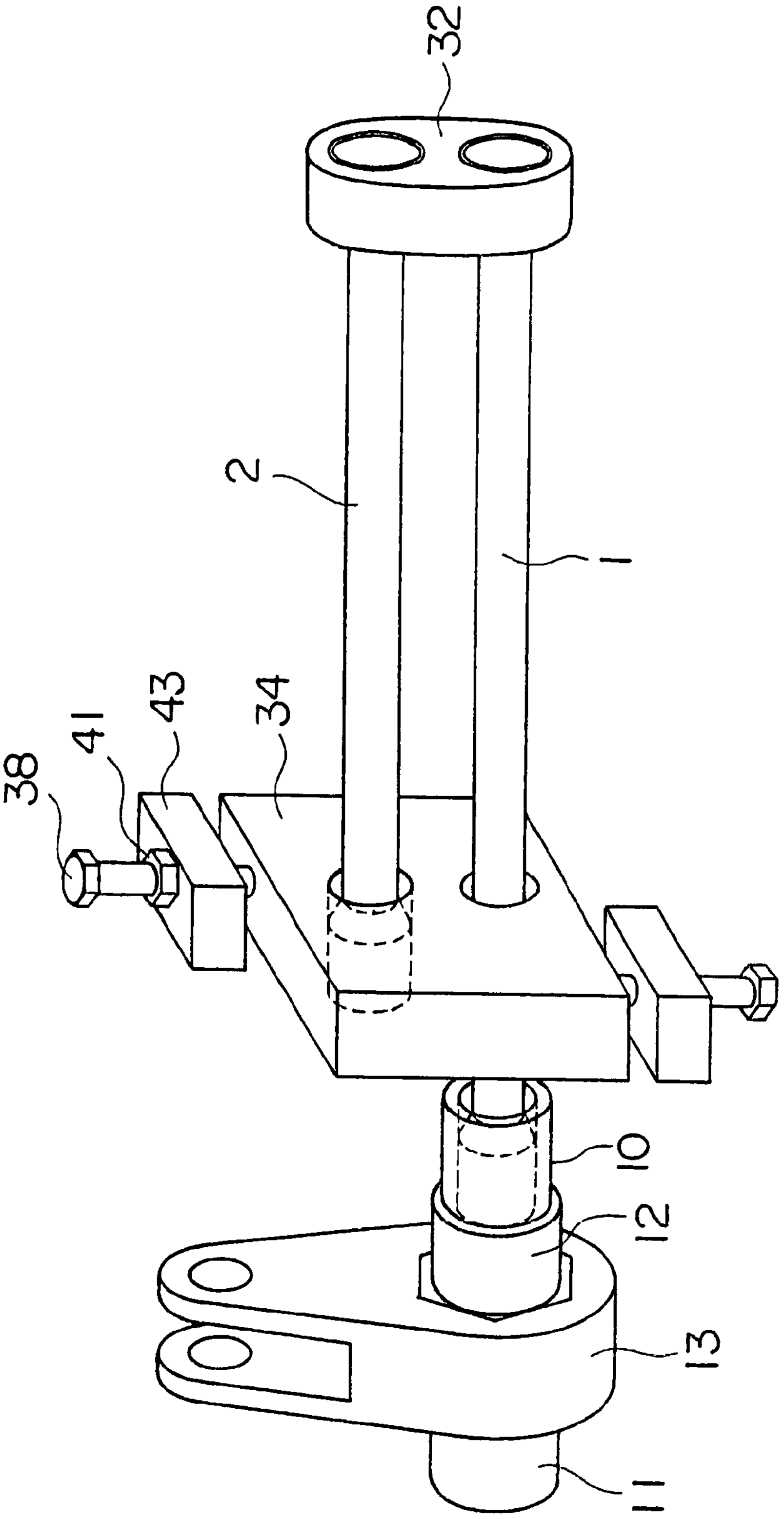
FIG. 8 is a perspective view showing a driving force storing device for a switch operating mechanism according to a third embodiment of the present invention.
Figure 9:
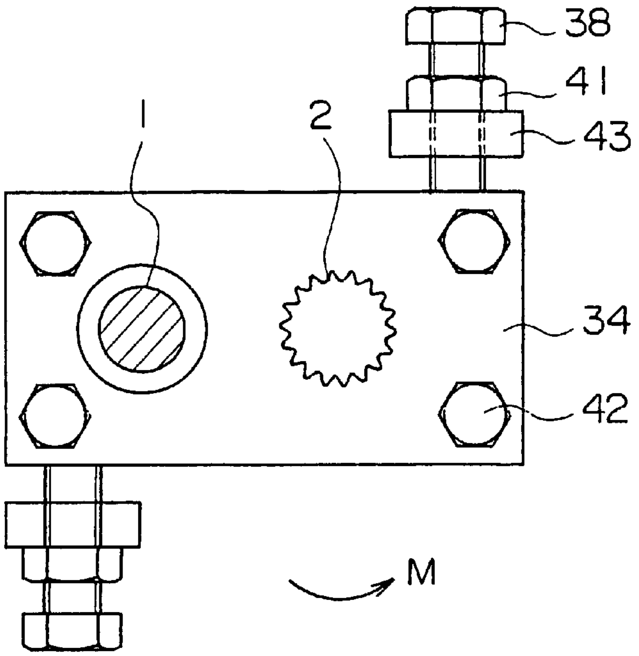
FIG. 9 is a front view showing the essential portion of FIG. 8.

Next, FIG. 8 is a perspective view showing a driving force storing device for a switch operating mechanism according to a third embodiment of the present invention, and FIG. 9 is a front view showing the essential part in FIG. 8. In the figures, one end of the first torsion bar 1 and one end of the second torsion bar 2 are fixed to a joint member 32, respectively. The other end of the second torsion bar 2 is fixed to a fixed member 34.

The fixed member 34 is fixed to a fixed part (not shown), that is a housing or the like, of the switch operating mechanism. The fixing angle of the fixed member 34 against the fixed part of the switch operating mechanism is adjustable about the second torsion bar 2. The initial torque is adjusted by adjusting the fixing angle of the fixed member 34.

A pair of bolt attaching portions 43 are fixed to the fixed part of the switch operating mechanism. An adjustment bolt 38 is screwed into each of the bolt attaching portions 43. A tip portion of each of the adjustment bolts 38 contacts the fixed member 34. Nuts 41 are screwed to the adjustment bolts 38 to prevent loosening. The fixed member 34 is provided with a plurality of fixing bolts 42 (omitted in FIG. 8) for fixing the fixed member 34 to the fixed part of the switch operating mechanism after adjusting the fixing angle. The other constructions are the same as in the first embodiment.

Next, the adjusting method for the initial torque will be described. First, in a completely released state, that is an initial torque state where the driving shaft portion 10 is rotated to the released position and the given rotational driving force is released, all fixing bolts 42 are loosened and fixation of the fixed member 34 is released. The direction of the torque applied by the first and second torsion bars 1 and 2 to the fixed member 34 is the direction of arrow M.

Further, the nuts 41 are loosened, the degree of screwing of the adjustment bolts 38 is adjusted, and the fixed member 34 is pivoted about the second torsion bar 2. When the fixed member 34 is pivoted at given pivoting angle, the fixed member 34 is fixed to the fixed part of the switch operating mechanism by fastening the nuts 41 and the fixing bolts 42. Thus, the initial torque of the driving force storing device is adjusted.

In such a driving force storing device, since the initial torque is adjusted by adjusting the fixing angle of the fixed member 34, the joint member 32 may be used only for fixing the first and second torsion bars 1 and 2, the construction of parts can be further simplified.

Further, since the fixing angle of the fixed member 34 is adjusted by adjusting the degree of screwing of the adjustment bolts 38, the fixing angle of the fixed member 34 can be finely adjusted by this simple construction. Furthermore, since the fixed member 34 is fixed to the fixed part by the fixing bolts 42, the adjusted fixing angle can be surely maintained.

Fourth Embodiment

Figure 10:
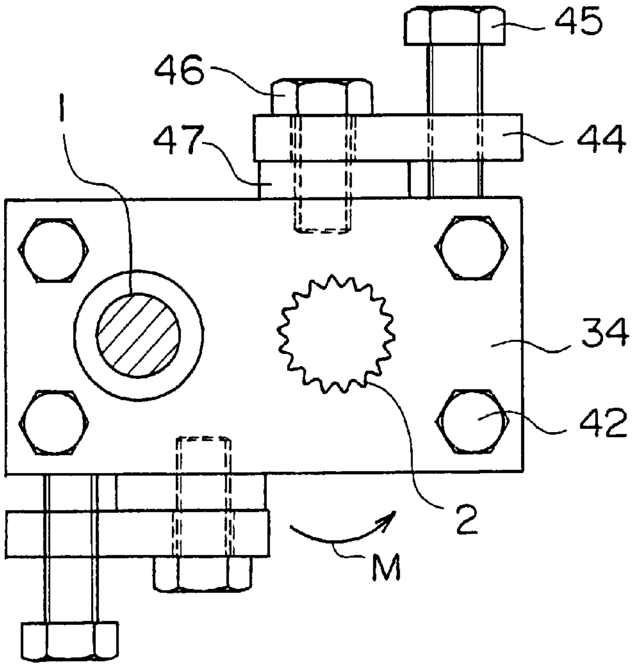
FIG. 10 is a front view showing an essential part of a driving force storing device for a switch operating mechanism according to a forth embodiment of the present invention.
Figure 11:
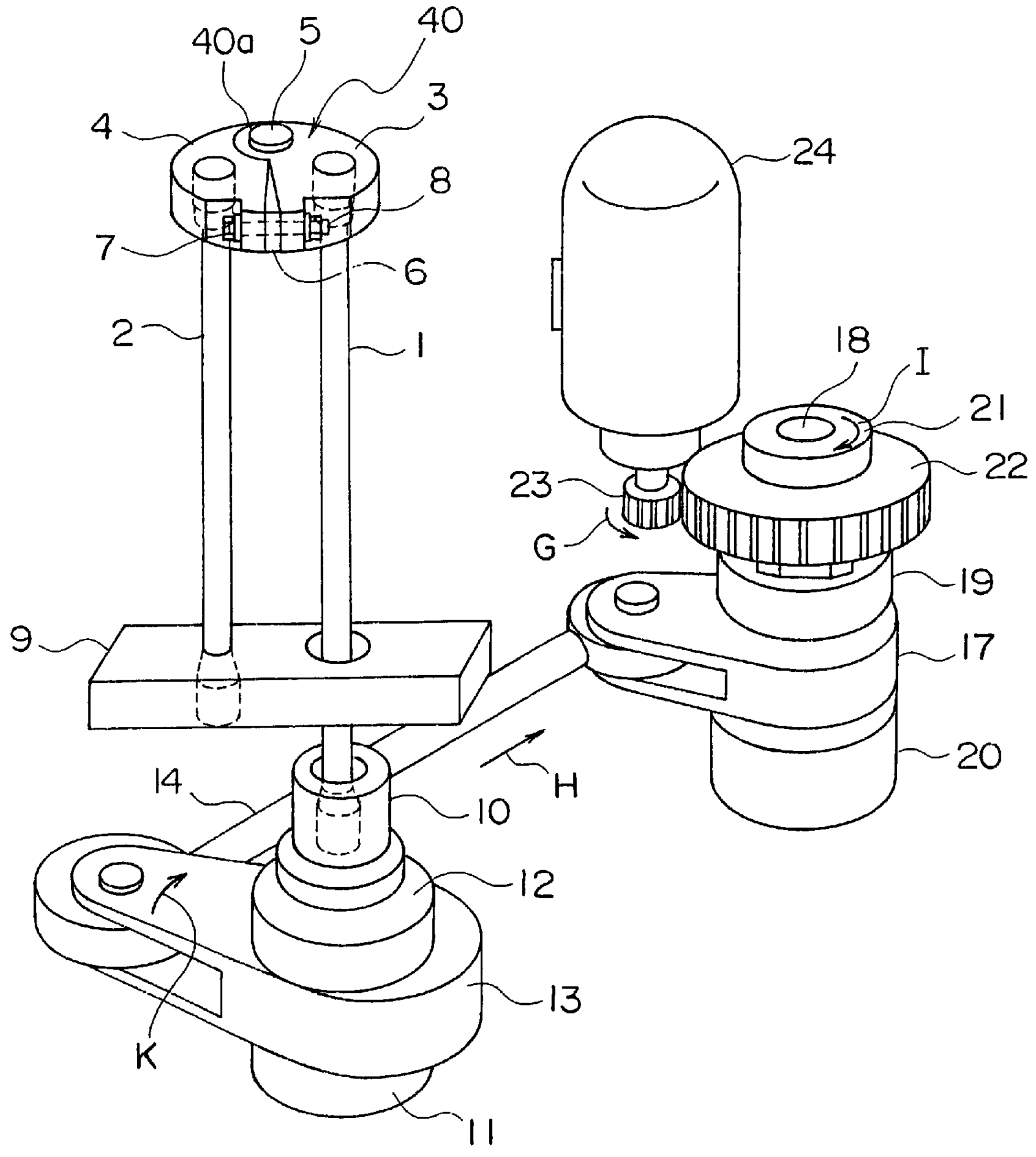
FIG. 11 is a perspective view showing an example of a conventional driving force storing device for a switch operating mechanism.
Figure 12:
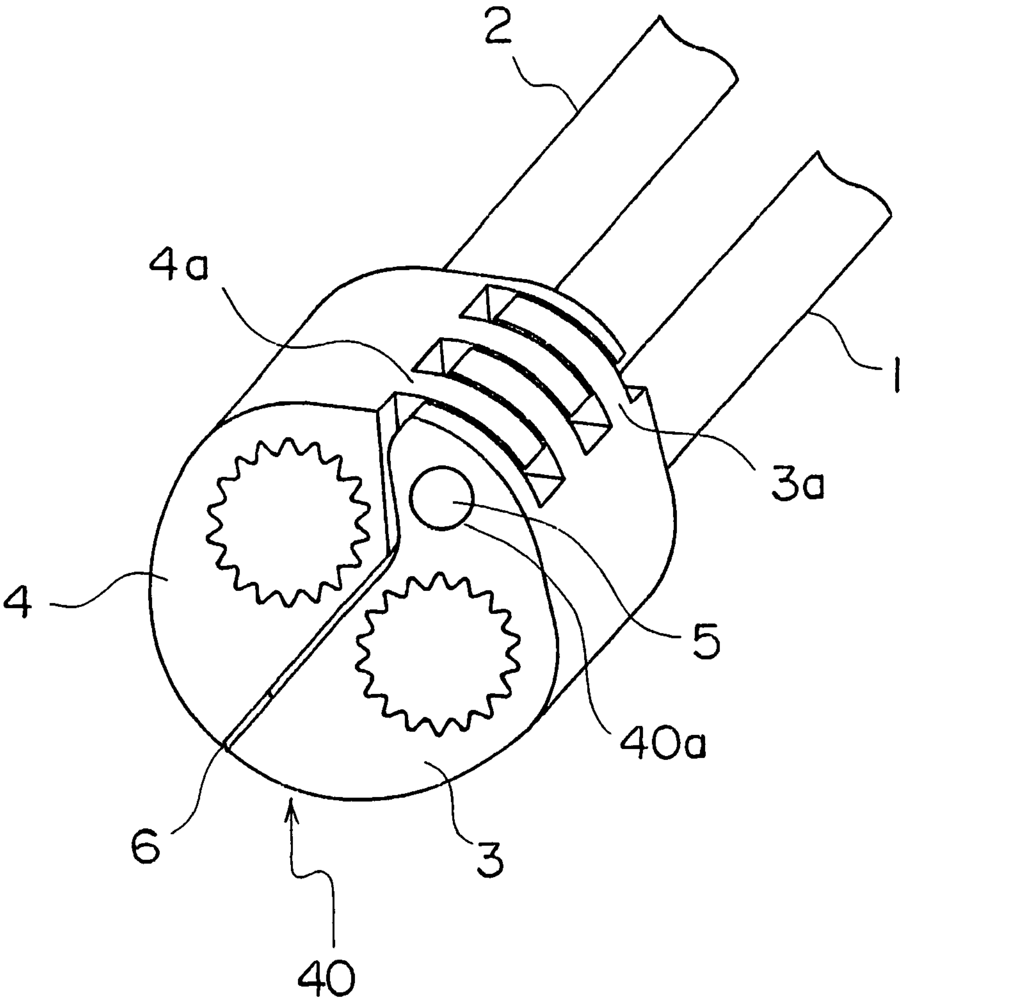
FIG. 12 is a perspective view showing the joint device in FIG. 11.

Next, FIG. 10 is a front view showing an essential part of a driving force storing device for a switch operating mechanism according to a forth embodiment of the present invention. In the figure, the fixing angle of the fixed member 34 against the fixed part of the switch operating mechanism is adjustable about the second torsion bar 2. Further, the initial torque is adjusted by adjusting the fixing angle of the fixed member 34.

A pair of bolt attaching portions 44 are fixed to the fixed part of the switch operating mechanism. An adjustment bolt 45 is screwed into each of the bolt attaching portions 44. A tip portion of each of the adjustment bolts 45 contacts the fixed member 34. The fixed member 34 is provided with a plurality of fixing bolts 42 for fixing the fixed member 34 to the fixed part of the switch operating mechanism after adjusting the fixing angle.

Spacer bodies 47 are disposed between the bolt attaching portions 44 and the fixed member 34. The spacer bodies 47 are clamped between the bolt attaching portions 44 and the fixed member 34 by fastening bolts 46. The other constructions are the same as in the third embodiment.

Next, the adjusting method for the initial torque will be described. First, in a completely released state, that is an initial torque state where the driving shaft portion 10 is rotated to the released position and the given rotational driving force is released, all fixing bolts 42 are loosened and fixation of the fixed member 34 is released. The direction of the torque applied by the first and second torsion bars 1 and 2 to the fixed member 34 is the direction of arrow M.

Further, the fastening bolts 46 are loosened, and the spacer bodies 47 are removed. Thereafter, the degree of screwing of the adjustment bolts 38 is adjusted, and the fixed member 34 is pivoted about the second torsion bar 2. When the fixed member 34 is pivoted at given pivoting angle, the fixed member 34 is fixed to the fixed part of the switch operating mechanism by fastening the fixing bolts 42. Further, the spacer bodies 47 corresponding to the fixing angle are disposed between the bolt attaching portions 44 and the fastening bolts 46, and the fastening bolts 46 are fastened. Thus, the initial torque of the driving force storing device is adjusted.

In such a driving force storing device, since the initial torque is adjusted by adjusting the fixing angle of the fixed member 34, the joint member 32 may be used only for fixing the first and second torsion bars 1 and 2, the construction of parts can be further simplified.

Further, since the fixing angle of the fixed member 34 is adjusted by adjusting the degree of screwing of the adjustment bolts 45, the fixing angle of the fixed member 34 can be finely adjusted by the simple construction. Furthermore, since the spacer bodies 47 are disposed between the bolt attaching portions 44 and the fixed member 34, the adjusted fixing angle can be surely maintained. Also, the adjustment of the initial torque can be facilitated by selecting the spacer bodies 47 corresponding to the initial torque.

What is claimed is:

1. A driving force storing device for a switch operating mechanism, comprising:

a joint device having a first joint portion on which a first opposing surface is formed, a second joint portion on which a second opposing surface opposing said first opposing surface is formed, and a coupling portion coupling said first joint portion with said second joint portion so that a distance between said first and second opposing surfaces is changeable;

a driving shaft portion mechanically connected to an operating portion of the switch operating mechanism, said driving shaft portion being rotatable between a stored position and a released position;

a first torsion bar connected between said first joint portion and said driving shaft portion, for storing a driving force by increasing the degree of twisting by rotating said driving shaft portion from said released position to said stored position, and for rotating said driving shaft portion from said stored position to said released position at the time of releasing;

a fixed member fixed to a fixed part of the switch operating mechanism;

a second torsion bar connected between said second joint portion and said fixed member; and an initial torque adjusting mechanism for adjusting an initial torque applied to said driving shaft portion positioned at said released position by adjusting a distance between said first and second opposing surfaces;

wherein a torque is applied to said joint device by said first and second torsion bars in a direction where said first and second opposing surfaces are separated from each other and said first and second joint portions are pushed toward said coupling portion.

2. The driving force storing device for a switch operating mechanism according to claim 1, wherein:

said first and second joint portions are constituted by separate parts, respectively;

said coupling portion has a pin and pin grooves formed on said first and second joint portions, respectively, said pin being inserted in said pin grooves; and said distance between said first and second opposing surfaces is adjustable by pivoting said first and second joint portions about said pin.

3. The driving force storing device for a switch operating mechanism according to claim 1, wherein said coupling portion is an elastic deformation portion coupling said first joint portion with said second joint portion, and said distance between said first and second opposing surfaces is adjustable by elastically deforming said elastic deformation portion.

4. The driving force storing device for a switch operating mechanism according to claim 1, wherein said initial torque adjusting mechanism has a spacer body disposed between said first and second opposing surfaces, a thickness of which being adjustable, and a fastener restraining opening of said first and second opposing surfaces to hold said spacer body between said first and second opposing surfaces.

5. A driving force storing device for a switch operating mechanism, comprising:

a joint member;

a driving shaft portion mechanically connected to an operating portion of the switch operating mechanism, said driving shaft portion being rotatable between a stored position and a released position;

a first torsion bar connected between said joint member and said driving shaft portion, for storing a driving force by increasing the degree of twisting by rotating said driving shaft portion from said released position to said stored position, and for rotating said driving shaft portion from said stored position to said released position at the time of releasing;

a fixed member fixed to a fixed part of the switch operating mechanism; and a second torsion bar connected between said joint member and said fixed member;

wherein a fixing angle of said fixed member against the fixed part of the switch operating mechanism is adjustable about said second torsion bar, and an initial torque applied to said driving shaft portion positioned at said released position is adjusted by adjusting the fixing angle of said fixed member.

6. The driving force storing device for a switch operating mechanism according to claim 5, further comprising:

a bolt attaching portion fixed to the fixed part of the switch operating mechanism; and an adjustment bolt screwed into said bolt attaching portion, a tip portion of which contacts said fixed member;

wherein the fixing angle of said fixed member is adjusted by adjusting the degree of screwing of said adjustment bolt.

7. The driving force storing device for a switch operating mechanism according to claim 6, further comprising a spacer body disposed between said bolt attaching portion and said fixed member.

8. The driving force storing device for a switch operating mechanism according to claim 5, wherein said fixed member is provided with a fixing bolt for fixing said fixed member to the fixed part of the switch operating mechanism after adjusting the fixing angle.

* * * * *